(12) United States Patent
Pasternak

(10) Patent No.: US 9,009,668 B2
(45) Date of Patent: Apr. 14, 2015

(54) SOFTWARE TESTING USING TEST ENTITY

(75) Inventor: Michael Pasternak, Raanana (IL)

(73) Assignee: Red Hat Israel, Ltd., Raanana (IL)

(*) Notice: Subject to any disclaimer, the term of this patent is extended or adjusted under 35 U.S.C. 154(b) by 706 days.

(21) Appl. No.: 12/789,199

(22) Filed: May 27, 2010

(65) Prior Publication Data

US 2011/0296382 A1    Dec. 1, 2011

(51) Int. Cl.
G06F 12/00 (2006.01)
G06F 11/36 (2006.01)

(52) U.S. Cl.
CPC .................. G06F 11/3688 (2013.01)

(58) Field of Classification Search
CPC ............ G06F 11/3688; G06F 11/3684; G06F 11/3664; G06F 11/0793
See application file for complete search history.

(56) References Cited

U.S. PATENT DOCUMENTS

| | | | |
|---|---|---|---|
| 6,931,627 B2 | 8/2005 | Arbouzov et al. | |
| 7,127,641 B1 | 10/2006 | Anderson | |
| 7,367,025 B1* | 4/2008 | Nikolov et al. | 717/158 |
| 7,398,469 B2 | 7/2008 | Kisamore et al. | |
| 7,594,219 B2 | 9/2009 | Ramachandran et al. | |
| 7,610,578 B1 | 10/2009 | Taillefer et al. | |
| 7,613,953 B2 | 11/2009 | Voruganti | |
| 7,890,806 B2 | 2/2011 | Kwong et al. | |
| 7,937,622 B2 | 5/2011 | Mehrotra | |
| 7,937,625 B2 | 5/2011 | Calinoiu et al. | |
| 7,992,133 B1* | 8/2011 | Theroux et al. | 717/124 |
| 8,276,123 B1 | 9/2012 | Deng et al. | |
| 8,276,126 B2 | 9/2012 | Farnham et al. | |
| 8,296,734 B2 | 10/2012 | Geppert et al. | |
| 8,375,251 B2* | 2/2013 | Ness et al. | 714/26 |
| 2004/0015870 A1 | 1/2004 | Arbouzov et al. | |
| 2004/0046787 A1* | 3/2004 | Henry et al. | 345/744 |
| 2004/0133881 A1 | 7/2004 | Chamberlain et al. | |
| 2005/0071818 A1 | 3/2005 | Reissman et al. | |
| 2005/0091640 A1* | 4/2005 | McCollum et al. | 717/117 |
| 2005/0204343 A1* | 9/2005 | Kisamore et al. | 717/124 |
| 2005/0273490 A1* | 12/2005 | Shrivastava et al. | 709/203 |
| 2006/0041864 A1 | 2/2006 | Holloway et al. | |
| 2006/0150188 A1* | 7/2006 | Roman et al. | 718/104 |
| 2006/0291398 A1* | 12/2006 | Potter et al. | 370/241 |
| 2007/0101196 A1* | 5/2007 | Rogers et al. | 714/38 |
| 2007/0157185 A1* | 7/2007 | Semerdzhiev et al. | 717/148 |
| 2007/0162894 A1 | 7/2007 | Noller et al. | |
| 2007/0180095 A1* | 8/2007 | Roth | 709/223 |
| 2008/0040706 A1 | 2/2008 | Blancha et al. | |
| 2008/0098205 A1* | 4/2008 | Dolve et al. | 712/220 |

(Continued)

OTHER PUBLICATIONS

Coulson et al. "The design of a configurable and reconfigurable middleware platform", Distrib. Comput. (2002) 15: 109-126.*

(Continued)

*Primary Examiner* — Polina Peach
(74) *Attorney, Agent, or Firm* — Lowenstein Sandler LLP

(57) ABSTRACT

A mechanism for performing dynamic software testing on a computer system using a test entity. A method of embodiments of the invention includes causing a test execution script to run a test based on a first configuration setting as defined in the test execution script. The test execution script is executed in a script execution environment utilizing a software framework of a computer system. The method further includes modifying, in runtime, the first configuration setting into a second configuration setting, and causing, in runtime, the test execution script to rerun the test based on the second configuration setting.

18 Claims, 9 Drawing Sheets

(56) References Cited

U.S. PATENT DOCUMENTS

| | | | |
|---|---|---|---|
| 2008/0109790 A1 | 5/2008 | Farnham et al. | |
| 2008/0127101 A1 | 5/2008 | Anafi et al. | |
| 2008/0209413 A1* | 8/2008 | Kakumani et al. | 717/172 |
| 2008/0222454 A1* | 9/2008 | Kelso | 714/38 |
| 2008/0256517 A1 | 10/2008 | Atkin et al. | |
| 2008/0270998 A1 | 10/2008 | Zambrana | |
| 2008/0306752 A1 | 12/2008 | Wagner et al. | |
| 2009/0199160 A1 | 8/2009 | Vaitheeswaran et al. | |
| 2011/0258600 A1 | 10/2011 | Osenkov et al. | |
| 2012/0059921 A1* | 3/2012 | Serban et al. | 709/223 |

OTHER PUBLICATIONS

USPTO, Office Action for U.S. Appl. No. 12/789,248 mailed on Jun. 20, 2012.
USPTO, Final Office Action for U.S. Appl. No. 12/789,248 mailed Jan. 15, 2013.
USPTO, Office Action for U.S. Appl. No. 12/789,228 mailed Feb. 12, 2013.
USPTO, Office Action for U.S. Appl. No. 12/789,248 mailed Jan. 23, 2014.
USPTO, Advisory Action for U.S. Appl. No. 12/789,248 mailed Mar. 22, 2013.
USPTO, Notice of Allowance for U.S. Appl. No. 12/789,248 mailed Jun. 3, 2014.
USPTO, Final Office Action for U.S. Appl. No. 12/789,228 mailed Aug. 13, 2013.
USPTO, Notice of Allowance for U.S. Appl. No. 12/789,228 mailed Nov. 12, 2013.
U.S. Appl. No. 11/388,445, Probabilistic System for Identifying Software Development Regressions, filed Mar. 24, 2006, 21 pages.
Lucia et al., "Recovering Traceability Links in Software Artifact Management Systems using Information Retrieval Methods," ACM Transactions on Software Engineering and Methodology (TOSEM), vol. 16, Issue 4, Sep. 2007. Retrieved on [Oct. 28, 2013], Retrieved from the Internet: URL <http://dl.acm.org/citation.cfm?id=1276934>.
Canfora et al., "Fine Grained Indexingof Software Repositories to Support Impact Analysis," Proceedings of the 2006 international workshop on Mining software repositories, 2006, pp. 105-111, Retrieved on [Oct. 28, 2013] Retrieved from the Internet: URL<http://dl.acm/org/citation.cfm?id=1138009>.
Grindal, M., "Evaluation of Combination Strategies for Practical Testing," Technical Report HS-IKI-TR-04-003, Jun. 23, 204, 62 pages [retrieved on May 30, 2014], Retrived from the Interned: , URL:http://www.diva-porta.org/smash/record.jsf?pid=diva2:2400>.
Rose, L., "Getting the Most Out of an Automated Test Tool," Rational Software Whitepaper, 1997, 12 pages, [retrieved on May 20, 2014], Retrieved from the Internet: <URL:http://rtsys.informatik/uni-kiel.de/teaching/ss03/2-rtcode/papers/ll_rose.pdf.

\* cited by examiner

Test entity by 'Select-Test' cmdlet: ⎯ 382

```
PS C:\Documents and Settings\mpastern> Select-Test -Id 114
PS C:\Documents and Settings\mpastern> Select-Test -Name KSM_Migrate ID             : 114
Active         : True
Name           : Some_Benchmark_v1
BaseTestName   : Some_Benchmark
ScriptName     : Some_Benchmark
ScriptLocation : \\server\script_location
```

Returned 'Test' object provides list of 'execution-info' methods: ⎯ 384

LastRun() – returns 'TestResult' object of current test, where its last time ran.
LastFailed() – returns 'TestResult' object of current test, where its time failed.
LastPass() – returns 'TestResult' object of current test, where its time passed.
GetAllInstances() – returns 'TestResult[]' array of all execution instances of current 'Test'.

Modifying test configuration at runtime. ⎯ 386

1. $t=select-test -Id 117

2. $conf = $t.GetConfiguration()

Where $conf is:

| QtmsConfiguration | IniConfiguration | TestId |
|---|---|---|
| ----------------- | ---------------- | ------ |
| (vmnum, nicType, Performance... | {cluster, scriptfile, SysMarkTempat... | 117 |

3. $conf.IniConfiguration: ...

4. $conf.QtmsConfiguration:

| Key | Value |
|---|---|
| --- | ----- |
| Cluster | Default |
| amount_Of_VMs_In_Iteration | 7 |
| OperatingSystem | winxp-32-sysmrk |
| startDelay | 5 |
| iterationRetry | 2 |
| dontJoinToDomain | 1 |
| debug | 0 |
| nicTyp | rt18139_pv |
| vmnum | 28 |
| Memory | 1024 |

FIG. 3B

Executing test at runtime with different configurations, on different setups across the lab. ⎯ 388

```
bool  Run(string setup, string os)
bool  Run(string setup, string os,DataCenter DataCenter)
bool  Run(string setup, string os, DataCenter DataCenter, int Cluster)
bool  Run(string setup, string os,string build)
bool  Run(string setup, string os, string build, TestConfiguration c)
bool  Run(string setup, string os, TestConfiguration c)
bool  Run(string setup, string os, TestConfiguration c,DataCenter dc)
bool  Run(string setup, string os, TestConfiguration c, DataCenter Dc, int
Cluster)

Example:

$test.Run("silver","winxp-32-sysmrk")
```

FIG. 3B (cont.)

SOFTWARE TESTING USING TEST ENTITY

RELATED APPLICATIONS

The present application is related to co-filed U.S. patent application Ser. No. 12/789,228 entitled "Mechanism for Performing Dynamic Software Testing Based on Test Result Information Retrieved in Runtime Using Test Result Entity" and U.S. patent application Ser. No. 12/789,248 entitled "Mechanism for Performing Dynamic Software Testing Based on Grouping of Tests Using Test List entity", which are assigned to the assignee of the present application.

TECHNICAL FIELD

The embodiments of the invention relate generally to software testing and, more specifically, relate to performing dynamic software testing using test entity.

BACKGROUND

It is commonly known that administrative tasks include software testing various entities (e.g., software components, network protocols, etc.) using various script executing platforms (e.g., Windows PowerShell® platform) that use test execution scripts (e.g., PowerShell script) and are powered by extensible automated engines, such as PowerShell® invocation engine (e.g., System.Management.Automation.dll), and software frameworks (e.g., .NET framework). However, complications occur when testing is to be performed based on various (software and/or hardware) configuration settings, and the testing process becomes even more convoluted, and even unmanageable, when one or more configuration settings are to be modified. This is because today's testing solutions require testing team members (e.g., software developers) to build a test execution platform or infrastructure with multiple rules/regulations and configuration setting variants to accommodate each test and its corresponding hardware and software configuration settings, separately and independently, which, at best, requires constant supervision and rerunning of failed tests and, at worst, becomes overly complex and unmanageable.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

FIG. 3B illustrates a transaction sequence for performing dynamic testing using test entity according to one embodiment of the invention;

DETAILED DESCRIPTION

Embodiments of the invention provide for performing dynamic software testing using a test entity. A method of embodiments of the invention includes causing a test execution script to run a test based on a first configuration setting as defined in the test execution script. The test execution script is executed in a script execution environment utilizing a software framework of a computer system. The method further includes modifying, in runtime, the first configuration setting into a second configuration setting, and causing, in runtime, the test execution script to rerun the test based on the second configuration setting.

The embodiments of the invention are used to improve software testing by employing a test entity that enables a test execution script to perform dynamic software testing based on modifying hardware and/or configuration settings. In one embodiment, the test entity provides the execution script the necessary ability to run or rerun tests by dynamically adapting to changing configuration settings. This dynamic and smart testing is performed in runtime (e.g., modification to configuration setting is made in runtime, the execution script adapts to any configuration modification in runtime, etc.), eliminating the need for creating complex, costly, and often unmanageable test execution infrastructures to hold multiple rules and configuration variants to accommodate different configuration settings and so each test can run independently.

Figure 1:
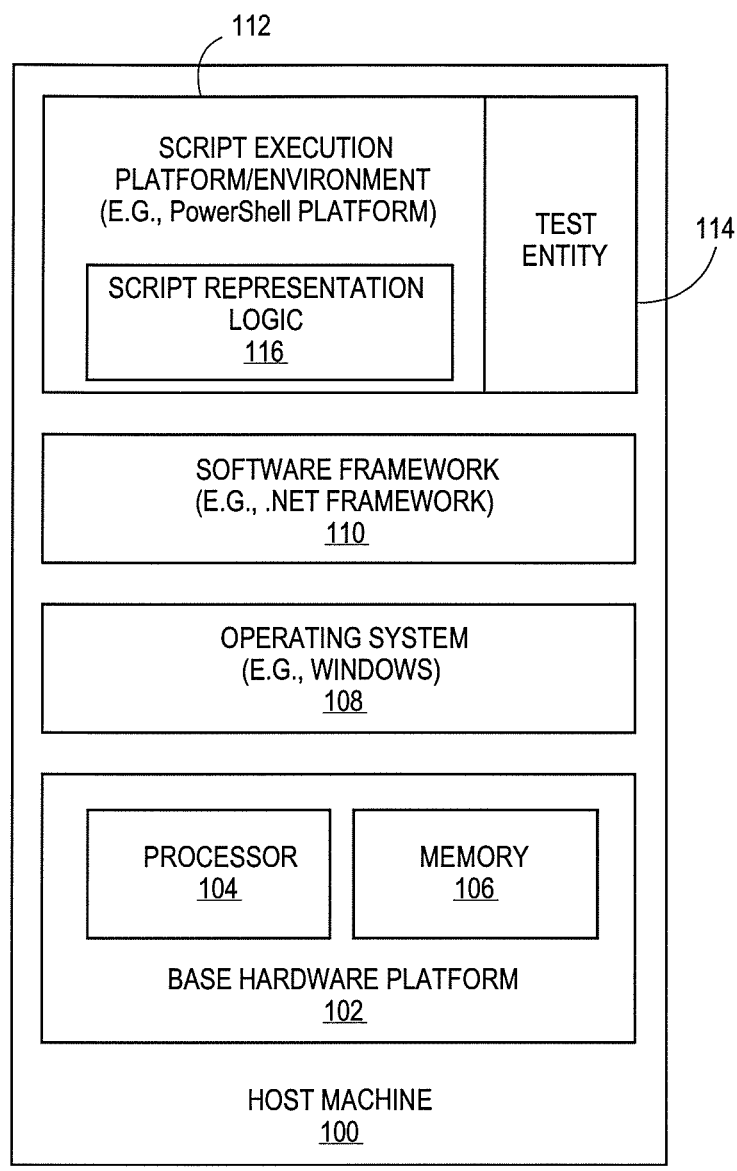
FIG. 1 illustrates host machine for employing a test entity for enabling a test execution script at a script execution platform for performing dynamic software testing according to one embodiment of the invention.

FIG. 1 illustrates host machine 100 for employing a test entity 114 for enabling a test execution script at a script execution platform 112 for performing dynamic software testing according to one embodiment of the invention. Host machine 100 includes a base hardware platform 102 that comprises a computing platform, which may be capable, for example, of working with a standard operating system 108 (e.g., Microsoft® Windows®, Linux®, etc.). Operating system 108 serves as an interface between hardware or physical resources of the host machine 100 and a software framework 110 (e.g., Microsoft .NET® Framework). In some embodiments, base hardware platform 102 may include a processor 104, memory devices 106, network devices, drivers, and so on. Host machine 100 includes a server computer system and/or a client computer system (e.g., a client device).

Software framework 110 may provide features (e.g., user interface, database connectivity, network communication, etc.) allowing to address common programming problems and a virtual machine to manage the execution of software programs written for the software framework 110. Script execution platform or environment 112 (e.g., Windows® PowerShell®) supports a test execution script (e.g., PowerShell® script) and is built on software framework 110. Script execution platform 112 may include an extensible automation engine that includes a command-line shell and a corresponding test execution scripting language, such as PowerShell script. As aforementioned, script execution platform 112 is built on software framework 110 to provide an environment for a user (e.g., software developers/administrators) to perform local and remote administrative tasks (including software testing). Using the PowerShell script as a test execution script, these administrative tasks may be performed by execution of command-lets ("cmdlets") that are specialized classes (e.g., .NET classes) implementing a particular operation and are combined using scripts, which are composition of cmdlets and imperative logic, standalone applications, or by instantiating regular classes. For brevity and simplicity, PowerShell platform, PowerShell Script, .NET Framework, and Microsoft Windows are used as examples throughout this document.

Script execution platform 112 provides a hosting mechanism for the test execution script that can be used by the user to produce and run software tests. For example, when testing a software component, the user defines certain properties (e.g., rules, regulations, script behavior, testing time limit, alerts, errors and exceptions, etc.) and software and/or hardware configuration settings relating to the test by inserting such properties and settings in the execution script prior to running the test. The user then initiates the test using a script (or Graphical User Interface (GUI)-based) representation and the execution script runs the test according to the defined properties and configuration settings. In one embodiment, script representation logic 116 of script execution platform 112 provides logical script representation of testing or testing information (e.g., test scripts, test results, test history, test statistics, configuration settings and information, etc.) shown as an example with reference to FIG. 3B. The user further uses the logical script representation to perform certain administrative tasks, such as amending test scripts, starting or stopping tests, modifying configuration settings, etc. In one embodiment, some or all of the testing information may be provided using a GUI-based screen or representation. Test entity 114 may serve as a database interface to access a database coupled to the host machine 100 for relevant testing information (e.g., test scripts, test results, test history, test statistics (such as pass/fail percentage) based on test history, etc.), and serve as a user interface to, in communication with script representation logic 116, provide access to a script representation (as shown in FIG. 3B) or a GUI-like representation.

In one embodiment, test entity 114 is provided as an extension of script execution platform 112 to enable the test execution script to run and rerun various software tests based on changing configuration settings (e.g., software and/or hardware configuration settings) in runtime. Test entity 114, in one embodiment, includes one or more modules that incorporate test entity invocation logic (also referred to as "test logic" or "test invocation logic") (FIGS. 2A, 2B) to enable the execution script to define itself, adjust itself, and decide its own behavior based on runtime-modification of hardware and/or software configuration settings relating to various tests.

Test entity invocation logic, in one embodiment, includes a single logic having a single configuration variant (as opposed to requiring a separate one for each test and/or hardware/software configuration setting) having the ability to dynamically adjust, in runtime, according to various test properties and the changing configuration settings. Test entity 114 enables the execution script to make decisions on how a test is to be executed by it so that the testing infrastructure may remain simplified and manageable (e.g., the execution script limits itself in focusing on the available resources to satisfy the current resting requirements). Test entity 114 includes an additional ability to, automatically, create test replications and run them with changing hardware/software configuration settings, in runtime, to provide the ability to compare results of different tests on multiple hardware/software configuration settings.

Throughout this document, the term "in runtime" at least refers to performing a task (e.g., modifying hardware or configuration settings, enabling an execution script at the script execution platform 112 to run/rerun a test according to the modified configuration setting, etc.) without pausing or stopping the testing system, such as without having to stop the test execution script from running one or more tests that the execution script is in the process of running or build a new test infrastructure to accommodate a newly modified configuration setting, or the like.

Figure 2A:
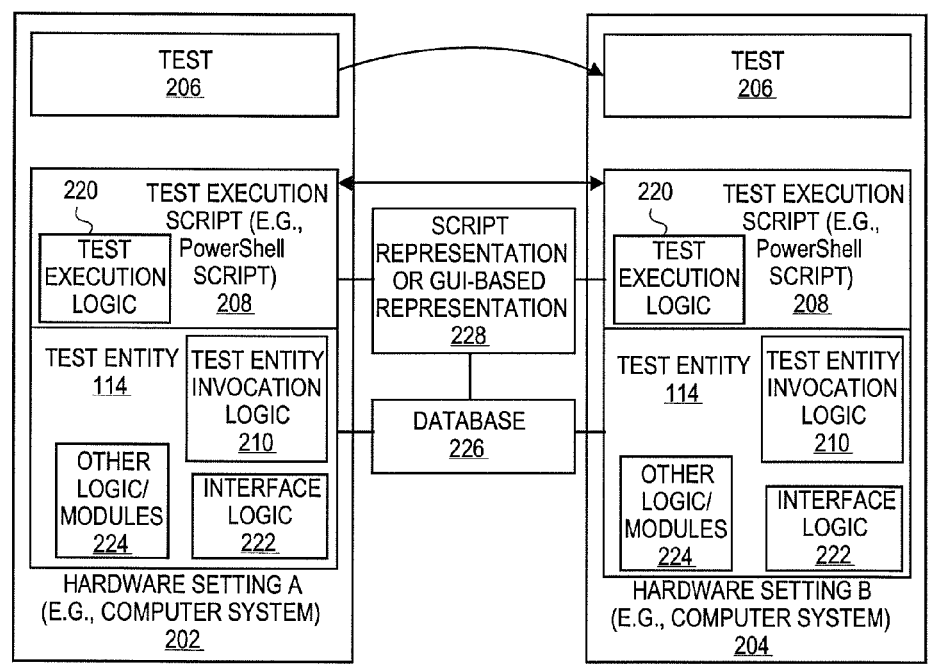
FIGS. 2A and 2B illustrate transaction sequences for performing dynamic testing using test entity according to one embodiment of the invention.
Figure 2B:
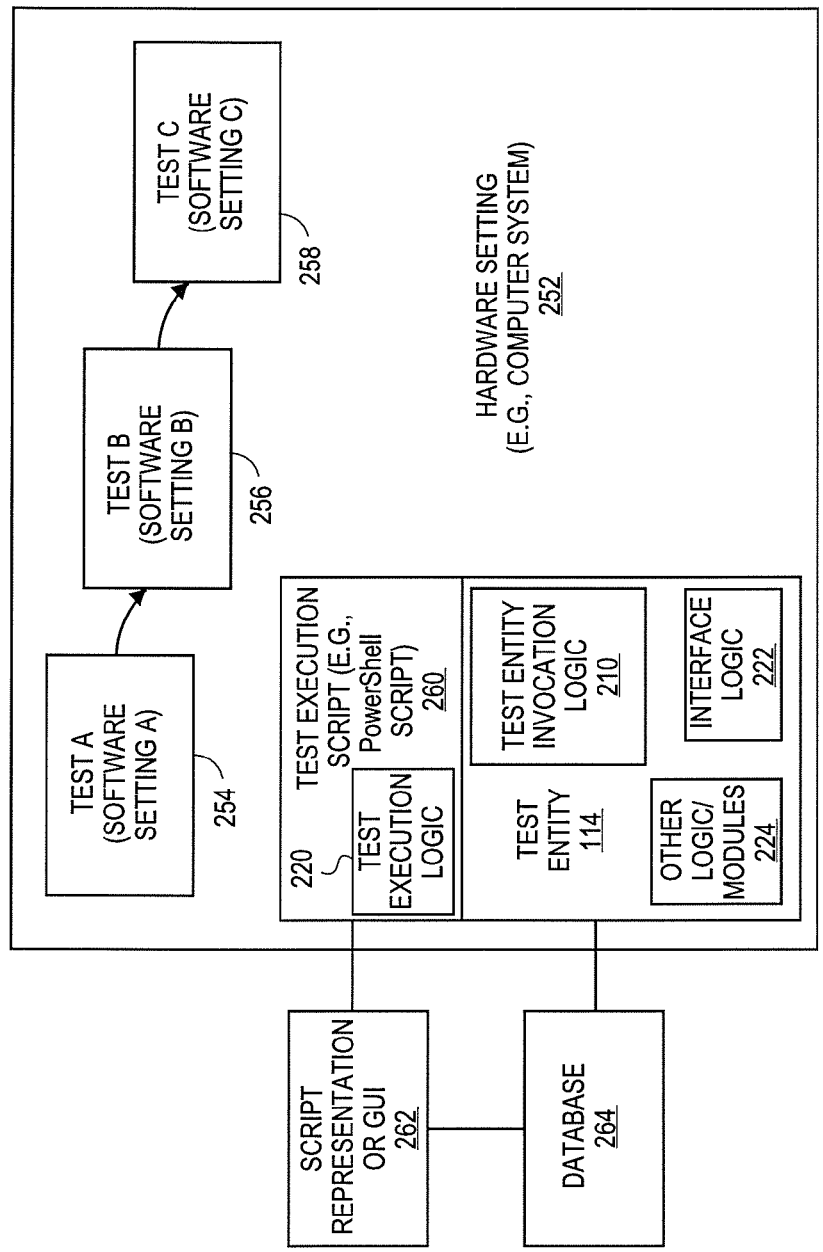

FIGS. 2A and 2B illustrate transaction sequences for performing dynamic testing using test entity 114 according to one embodiment of the invention. FIGS. 2A and 2B refer to transaction sequences relating to modifying hardware configuration settings A 202 and B 204 and software configuration settings A 254, B 256 and C 258, respectively. For example, a user, such as a software developer, wishes to test a new network protocol and its performance on multiple hardware settings A 202, B 204 (e.g., computer systems A and B). Initially, the user defines a set of properties for running test 206 on hardware setting A 202 and inserts the necessary language in the test execution script 208 so that the execution script behaves according to these properties on hardware setting A 202. These properties, as aforementioned, may include a set of rules, regulations, performance criteria, and the like, to properly and successfully test, in this case, the network protocol and its performance in relation to various hardware settings A 202, B 204 (as in FIG. 2A) and various software settings (as in FIG. 2B).

Continuing with the network protocol testing example, the user runs test 206 on hardware setting A 202 to test, for example, the central processing unit (CPU) usage as it relates to the new network protocol that is being tested for the newest (internal release) version of a product (e.g., software package). In one embodiment, test entity invocation logic 210 triggers test execution logic 220 by referencing it to cause test execution script 208 to run test 206 on hardware setting A 202 according to the properties as set forth by the user in the test execution script 208. Upon completing test 206, the user may view its results using script or GUI-based representation 228. Let us suppose, the CPU usage on hardware setting A 202 is determined to be 18%, but the user is seeking the usage to be under 15% and thus, reruns test 206 on hardware setting B 204. For example, the user moves test 206 and executes the same test 206 now on hardware setting B 204 (having, for example, a CPU speed of 3 GHz) which is different from hardware setting A 202 (having, for example, a CPU speed of 2 GHz). Modifying or using different hardware configuration settings A-B 202-204 could be of any nature, such as two computer systems having different processors (e.g., using a 3 GHz processor as opposed to using a 2 GHz processor), memory sizes (e.g., using a 256 MB Random Access Memory (RAM) as opposed to using a 512 MB RAM), etc.

Test entity invocation logic 210 references test execution logic 220 to (re)run test 206 on hardware setting B 204 and although this hardware setting B 204 is different from the previous hardware setting A 202 (e.g., two different computer systems with different processor speeds), test 206 is run using test execution script 208 without having to require a complicated testing infrastructure. In one embodiment, test entity 114 is free of hardware (and software) dependencies and does not abstract hardware settings A-B 202-204. The abstraction layer for test entity 114 is achieved by providing a "setup" argument in an execution constructor of the test execution script 208. Test entity 114 may have a number of execution overloads, such as the ones provided as examples in box 388 of FIG. 3B. The setup parameter of test entity 114 is an execution parameter that represents different physical devices (which may have different hardware profiles) on which test execution script 208 is executed. Further, test entity 114 is not an execution script; rather, it references the test execution script 208 that acts as a black-box so none of the script changes influence test entity 114. Test entity invocation logic 210 dictates various new (hardware and/or software) configuration settings to the test execution logic 220 (that are passed to it) through command-line arguments and/or configuration objects.

Now, let us suppose the results of rerunning the test 206 shows a satisfactory use of 14% CPU on hardware setting B 204 and, at this point, the user may choose to terminate further testing. The user may continue to rerun the same test 206 on any number of modified hardware settings using test execution script 208, and the test entity 114 continues to enable the test execution script 208, by referencing test execution logic 220, to adjust according to the modified hardware settings.

Similarly, the user may choose to test the new network protocol on different software settings A-C 254-256. Examples of modifying or using different software settings A-C 254-258 include changing virtual machine speed, number of virtual machines in iteration, using different operating systems for the same test, modifying software components of the software product that is being tested or of any software application running on host machine (e.g., hardware setting 252), etc. In this case, the user creates tests A-C 254-256 by setting initial properties as they relate to these tests A-C 254-256 by inserting proper language in test execution script 260. The user starts with running test A 254 (based on software configuration setting A which includes, for example, ten virtual machines) and modifies, in runtime, software setting A to change to software setting B (which includes, for example, twenty virtual machines) and then to software setting C (which includes, for example, thirty virtual machines). Accordingly, in one embodiment, test entity invocation logic 210 of test entity 114 dictates to test execution logic 220 of the changing software configuration settings 254-256 and enables the test execution script 260, by referencing its test execution logic 220, to run tests A-C 254-258, consecutively or concurrently using, for example, separate threads (e.g., virtual machines) as requested by the user, without having to stop the system or create a complex testing infrastructure. Test entity 114 further includes interface logic 222 to provide a user interface to script representation (or GUI-like representation) 228 or a database interface to database 226. Database 226 may include relevant test information, such as tests scripts of current and previously-run tests, test history, test statistics based on test history, previously-tested hardware and software configuration settings, etc. Test entity 114 may include other logic or one or more modules 224 to perform other relevant tasks, such as listing or grouping of tests, accessing and retrieving testing information relating to previously-run tests from database 226, retrieve other testing information from database 226, which is provided or accessed in response to queries as discussed with reference to FIG. 3A, etc.

Network protocol testing, CPU performance and the number of virtual machines, etc., are merely used here as examples for simplicity and ease of understanding. Software testing involving test entity 114 includes software testing of any type, such as ranging from testing modules and components of a software application to testing complex and large-scale benchmarks, network scalability, testing internal releases of products (e.g., software package), antivirus scan loading, time drifting, user performance-related components, etc. Further, these tests can be performed for any number of reasons, such as investigating performance issues, performing load/stress testing, investigating regression issues relating to different product versions, etc. As an example, these testing techniques can be used to test a number of aspects of Red Hat Enterprise Virtualization (RHEV) products.

Figure 2C:
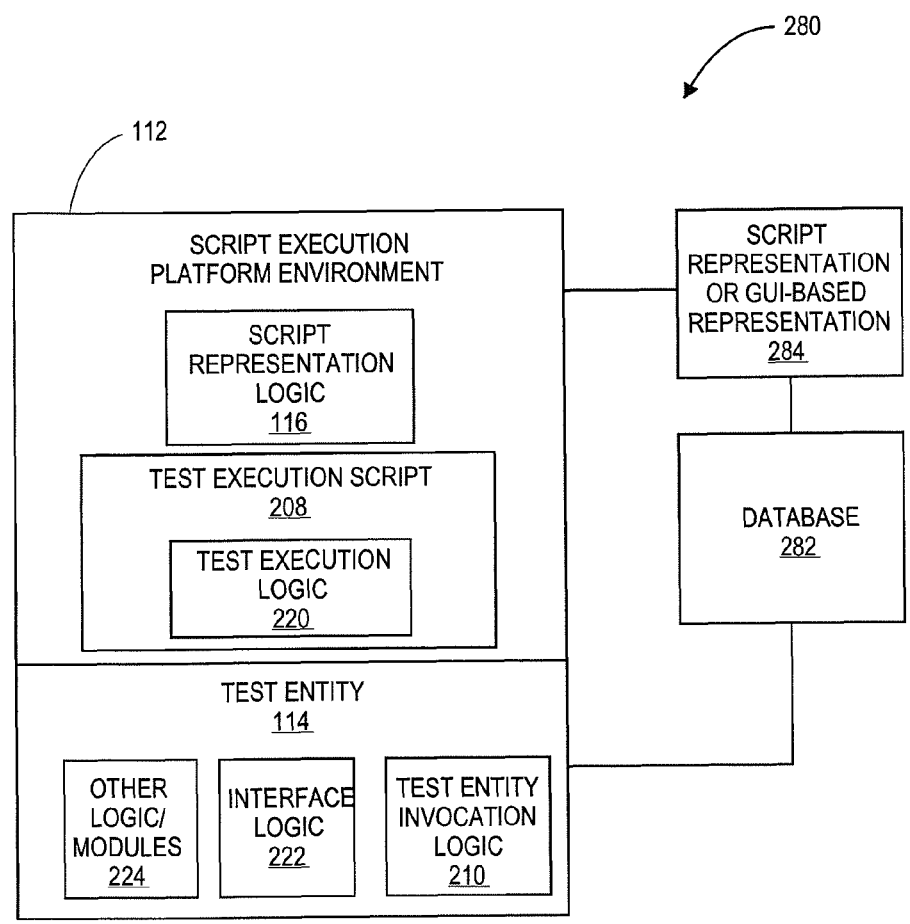
FIG. 2C illustrates a system employing a test entity for enabling a test execution script at a script execution platform for performing dynamic software testing according to one embodiment of the invention.

FIG. 2C illustrates a system 280 employing a test entity 114 for enabling a test execution script 208 at a script execution platform 112 for performing dynamic software testing according to one embodiment of the invention. This illustration is a simplified block diagram of the system 280 employing test entity 114 and other relevant components to perform various tasks as illustrated in FIGS. 2A and 2B. System 280 (e.g., server machine and/or client machine) runs on a standard operating system (e.g., Linux, Windows, etc.), and includes a script execution platform or environment 112 (PowerShell platform), built on a software framework (e.g., .NET Framework), supporting a test execution script 208 (PowerShell script). Script execution platform 112 includes script representation logic 116 to provide a script representation 284 of testing information (e.g., test scripts, test history, test statics, configuration settings, etc.) for the user to access, analyze, and manipulate. Further, GUI-based representation 284 may be provided. Script or GUI-based representation 284 is provided via a host machine and/or a client machine.

Test execution script 208 includes test execution logic 220 for execution of tests. Test entity 114 includes test entity invocation logic 210 that works in communication with test execution logic 220 to execute tests regardless of changes made to their software and/or hardware configuration settings. Interface logic 222 provides a user interface to for accessing script representation (or GUI-based representation) 284 and a database interface for accessing database 282 that stores testing information. Other logic or modules 224 are used for performing other tasks, such as access and retrieve testing information from database 282, performing listing or grouping of tests, etc.

Figure 3A:
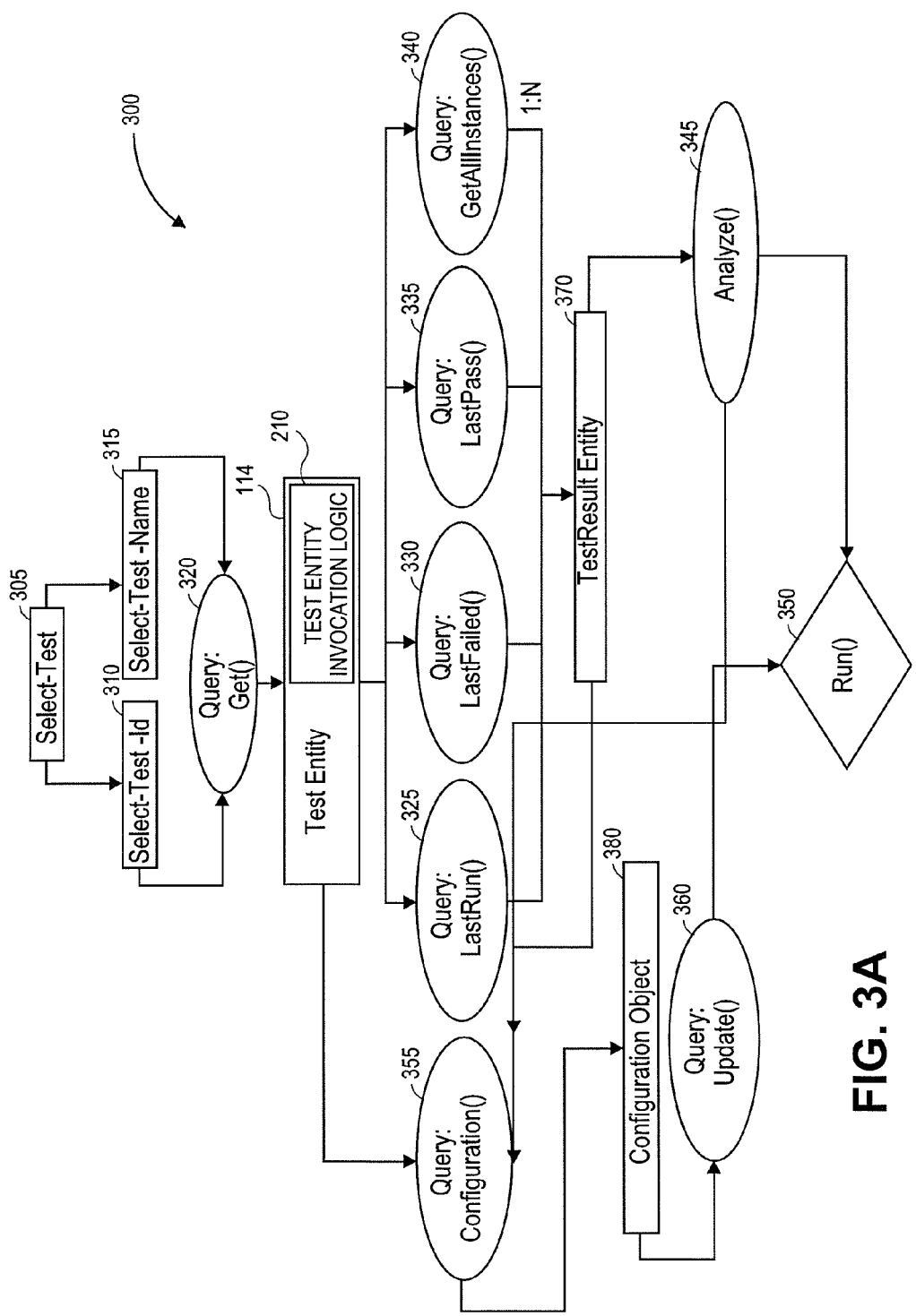
FIG. 3A illustrates a method for performing dynamic testing using test entity according to one embodiment of the invention.

FIG. 3A illustrates a method for performing dynamic testing using test entity according to one embodiment of the invention. Method 300 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 300 is performed by Test Entity 114 of FIG. 1.

Method 300 begins at block 305 with the selection (e.g., by a user) of a test to be run using an execution script at a script execution platform. The test may be selected using a form of test identification (e.g., test identification number) at block 310 or a test name at block 315. At block 320, test entity 114 is triggered and may be used to query data associated with the selected test from a database. The query is run in runtime and may include recalling history of the selected test (such as its previous runs) or, in some cases, other previously-run tests that relate to the selected test. These historical queries include querying data of the last run 325 of the selected test if the current selection is a rerun of the test, querying whether the selected run was previously run and failed 330, querying whether the selected run was previously run and passed 335, or querying all instances 340 of the selected test if it was previously run. At block 345, once such historical queries are performed, the results of the queries are obtained and analyzed using a test result entity 370.

At block 355, a configuration query is made to determine whether any configuration settings (such as hardware or software configuration settings) are to be modified. This determination may be based on predetermined criteria or on the analyses of the query results (block 345) performed in runtime. The developer may have predetermined to run/rerun the selected test with any number of modified configuration settings or determined, in runtime, to modify the default configuration settings based on the information obtained from analyzed query results (block 345). In either case, configuration settings are modified, in runtime, using configuration object 380, and updated at block 360, also in runtime, so that the selected test can run/rerun based on the updated configuration settings. The term "in runtime" refers to performing a task (e.g., modifying configuration settings) without pausing or stopping the testing processor or system, such as modifying configuration settings of a test while that test and/or other tests are being run by the execution script (e.g., PowerShell script).

FIG. 3B illustrates a transaction sequence for performing dynamic testing using test entity according to one embodiment of the invention. Block 382 (paralleling blocks 305-320 of FIG. 3A) illustrates selection of a test (e.g., select-test cmdlet) by choosing a form of test identification and/or a test name. Each test (including the selected test and its previous runs, if any) is a fully qualified test that can be configured and executed and is capable of having relevant execution information (e.g., last-run, last-passed, last-failed, Allinstances), in runtime, as illustrated by block 384 which parallels blocks 325-340 of FIG. 3A. Block 386, referencing blocks 355-360 of FIG. 3A, illustrates modification of test configuration settings, in runtime, including retrieving and modifying a hardware and/or software test configuration setting and saving (e.g., $conf.update( )) the modified test configuration setting for any number of future runs or simply creating it for a single use to be discarded after one run. Block 388 shows execution of the selected test, in runtime, with different configuration settings (including modified hardware and/or software configuration settings) as paralleling block 350 of FIG. 3A.

Figure 4:
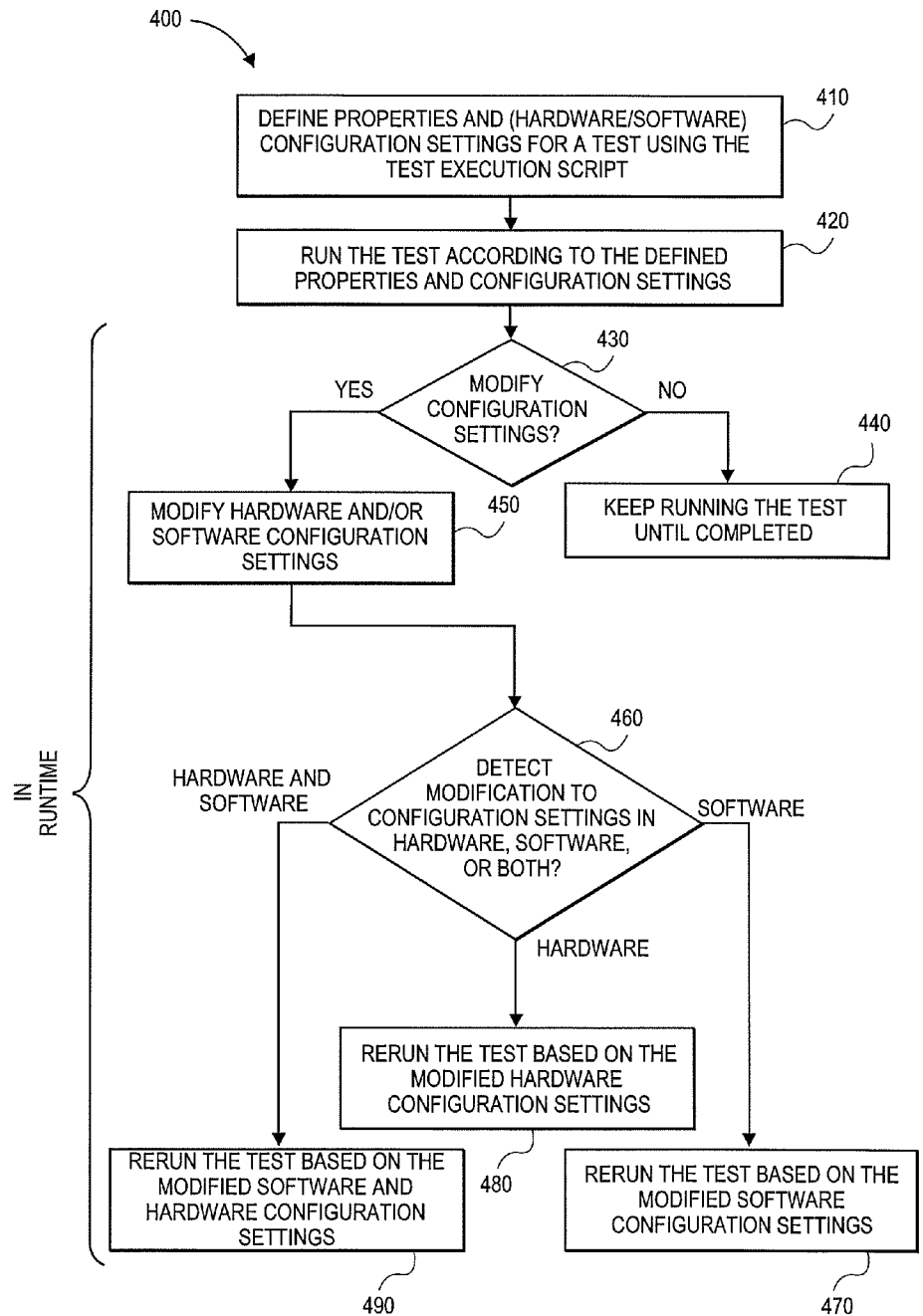
FIG. 4 illustrates a method for performing dynamic testing using test entity according to one embodiment of the invention.

FIG. 4 illustrates a method for performing dynamic testing using test entity according to one embodiment of the invention. Method 400 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 400 is performed by Test Entity 114 of FIG. 1.

At block 410, a test execution script (e.g., PowerShell script) is identified that includes various properties and hardware/software configuration settings for a test. For example, a user may choose to define any number of test properties and configuration settings by inserting the relevant information and language into the test execution script. At block 420, the test is run (e.g., as initiated by the user) using a script execution platform (e.g., PowerShell platform) that is based on a software platform (e.g., .NET framework) being powered by an operating system (e.g., Microsoft Windows). In one embodiment, upon user initiation, test entity enables the execution script to run the test according to the predefined test properties and configuration settings. The user may use a graphical user interface (GUI)-like application to initiate the test run. At block 430, a determination is made, in runtime, as to whether any modifications are to be made to the current configuration settings. If no modifications are to be made, the test may continue to run until its run is completed at block 440.

At block 450, modifications are made to the current configuration settings. In one embodiment, modification to configuration settings are made, in runtime, by a user using a script representation (or GUI-representation) provided at the host machine or client machine to make changes to any number of configuration settings, such as changes to software configuration settings (e.g., changing the number of virtual machines, modifying the operating system, etc.), changes to hardware configuration settings (e.g., switching a slower processor for a faster processor, decreasing the size of RAM, etc.). As aforementioned, the decision to modify could be predetermined or made based on query results. In either case, at block 460, test entity detects whether the modification was made to software or hardware or both hardware and software configuration settings. If software, at block 470, test entity enables the execution script to rerun the test based on the modified software configuration settings. Similarly, if hardware, at block 480, or both hardware and software, at block 490, test entity enables the execution script to rerun the test based on modified hardware configuration settings or modified hardware and software configuration settings, respectively.

Figure 5:
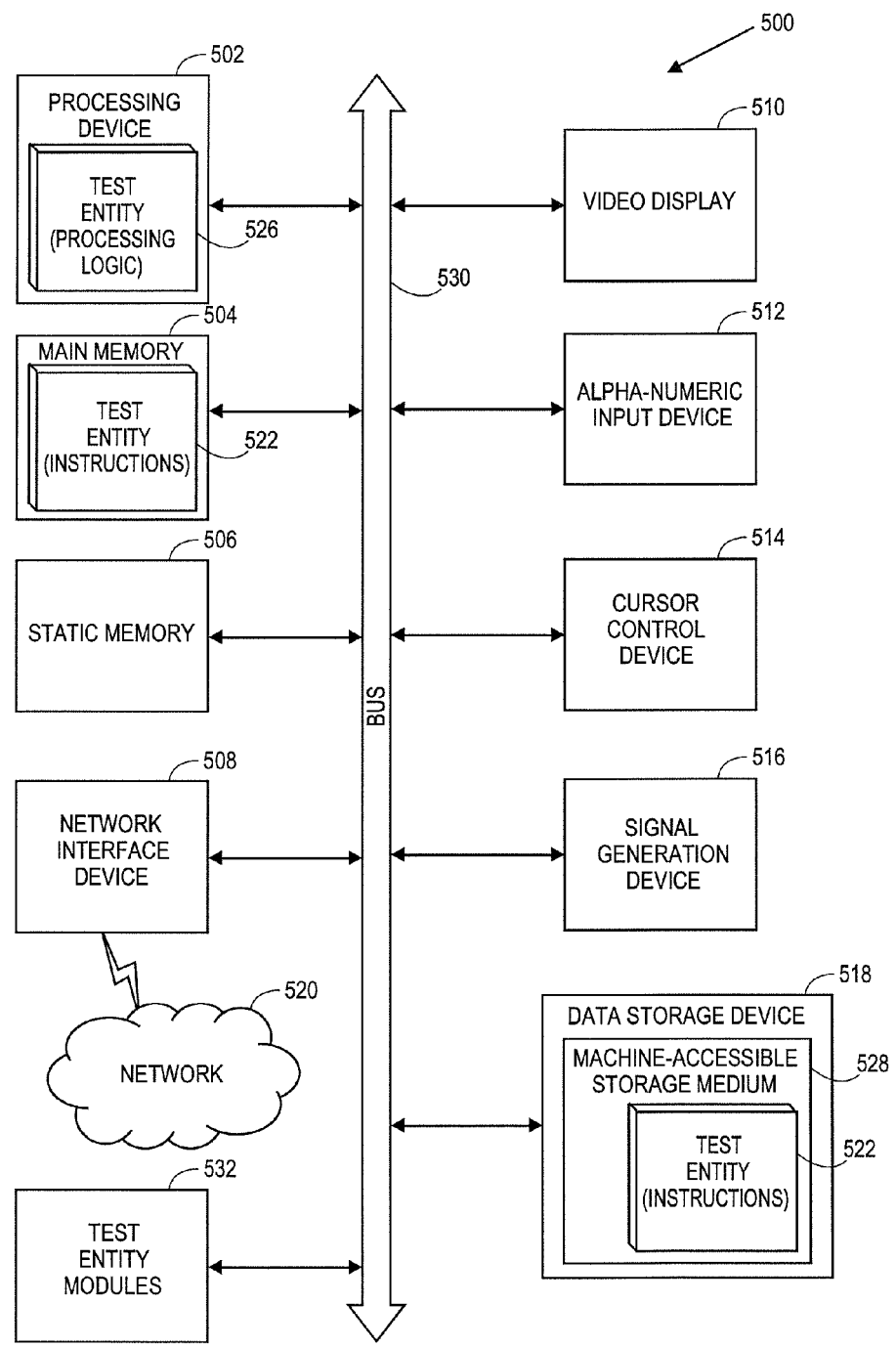
FIG. 5 illustrates one embodiment of a computer system.

FIG. 5 illustrates a computer system 500 for performing dynamic testing using test entity according to one embodiment of the invention. Within the computer system 500 is a set of instructions for causing the machine to perform any one or more of the methodologies discussed herein. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, random access memory (RAM), dynamic RAM (DRAM) such as synchronous DRAM (SDRAM), DRAM (RDRAM), etc.), a static memory 506 (e.g., flash memory, static random access memory (SRAM), etc.), and a secondary memory 518 (e.g., a data storage device in the form of a drive unit, which may include fixed or removable machine-accessible or computer-readable storage medium), which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic 526 for performing the operations and methods discussed herein.

The computer system 500 may further include a network interface device 508. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 516 (e.g., a speaker).

The data storage device 518 may include a machine-accessible storage medium (or a computer-readable storage medium) 528 on which is stored one or more sets of instructions 522 (e.g., test entity) embodying any one or more of the methodologies or functions described herein. The test entity may also reside, completely or at least partially, within the main memory 504 (e.g., test entity (instructions) 522) and/or within the processing device 502 (e.g., test entity (processing logic) 526) during execution thereof by the computer system 500, the main memory 504 and the processing device 502 also constituting machine-readable storage media. Further, for example, the test entity instructions 522 may be transmitted or received over a network 520 via the network interface device 508.

The machine-readable storage medium 528 may also be used to store the test entity (instructions) 522 persistently. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Test entity modules 532, components and other features described herein (for example in relation to FIG. 1) can be implemented as discrete hardware components or integrated in the functionality of hardware components such as ASICS, FPGAs, DSPs or similar devices. In addition, the modules 532 can be implemented as firmware or functional circuitry within hardware devices. Further, the modules 532 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "causing", "defining", "detecting", "running", "rerunning", "ending", "selecting", "modifying", "performing", "analyzing", "querying", "updating", "enabling", "providing", "storing", "saving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
providing, by a processing device, a test entity as an extension of a script execution environment, wherein the script execution environment is built on a software framework of a computer system of the processing device, and wherein the test entity comprising test entity invocation modules to implement configuration settings for a test managed by the test entity;
executing, by the test entity, a test execution script to perform the test on software in view of a first configuration setting defined in the test execution script via a setup parameter of the test entity, wherein the setup parameter comprises an execution parameter that represents different hardware profiles on which the test execution script is executed, and wherein the test execution script acts as a black-box to prevent script changes from influencing the test entity;
receiving, by test entity invocation logic of the test entity, a second configuration setting for the test via the setup parameter of the test entity, wherein the setup parameter provides an abstraction layer for the test entity from the first and second configuration settings, and wherein the test entity invocation logic comprises a single configuration variant;
providing, by test entity invocation logic, the second configuration setting for the test to test execution logic of the test entity, wherein the second configuration setting is passed to the test execution logic from the test entity invocation logic via at least one of command-line arguments or configuration objects;
modifying, by the test execution logic in runtime of the test execution script, the first configuration setting into the second configuration setting within the test execution script, wherein the abstraction layer enables the test execution logic to modify the test execution script without restarting the test execution script; and
causing, by the processing device in the runtime of the test execution script without restarting the test execution script, the test execution script to perform the test on the software in view of the second configuration setting, wherein the test execution script utilizes multiple threads to perform the test concurrently with other tests, wherein the test is select by choosing a form of at least one of test identification or test name, and wherein the test comprises execution information in runtime.

2. The method of claim 1, wherein the first and second configuration settings comprise at least one of hardware configuration settings or software configuration settings.

3. The method of claim 1, wherein the test is performed to test one or more software components of a software program.

4. The method of claim 1, wherein modifying the first configuration setting is based on predetermined criteria.

5. The method of claim 1, further comprising:
querying historical test run information relating to the test; and
analyzing the historical test run information.

6. The method of claim 1, wherein modifying the first configuration setting is based on the analyzed historical test run information.

7. A system comprising:
a processing device communicably coupled to a memory of a computer system comprising a script execution environment that comprises a test execution script, the processing device to provide a test entity as an extension of the script execution environment, wherein the script execution environment is built on a software framework of the system, and wherein the test entity comprising test entity invocation modules to implement configuration settings for a test managed by the test entity; and
the test entity executable from the memory by the processing device and communicably coupled to the script execution environment, wherein the test entity is to:
execute a test execution script to perform the test on software in view of a first configuration setting defined in the test execution script via a setup parameter of the test entity, wherein the setup parameter comprises an execution parameter that represents different hardware profiles on which the test execution script is executed, and wherein the test execution script acts as a black-box to prevent script changes from influencing the test entity;
receive, by test entity invocation logic of the test entity, a second configuration setting for the test via the setup parameter of the test entity, wherein the setup parameter provides an abstraction layer for the test entity from the first and second configuration settings, and wherein the test entity invocation logic comprises a single configuration variant;
provide, by test entity invocation logic, the second configuration setting for the test to test execution logic of the test entity, wherein the second configuration setting is passed to the test execution logic from the test entity invocation logic via at least one of command-line arguments or configuration objects;
modify, by the test execution logic in runtime of the test execution script, the first configuration setting into the second configuration setting within the test execution script, wherein the abstraction layer enables the test execution logic to modify the test execution script without restarting the test execution script; and
cause, in the runtime of the test execution script without restarting the test execution script, the test execution script to perform the test on the software in view of the second configuration setting, wherein the test execution script utilizes multiple threads to perform the test concurrently with other tests, wherein the test is select by choosing a form of at least one of test identification or test name, and wherein the test comprises execution information in runtime.

8. The system of claim 7, wherein the first and second configuration settings comprise at least one of hardware configuration settings or software configuration settings.

9. The system of claim 7, wherein the test is performed to test one or more software components of a software program.

10. The system of claim 7, wherein modifying the first configuration setting is based on predetermined criteria.

11. The system of claim 7, wherein the test entity is further to:
query historical test run information relating to the test; and
analyze the historical test run information.

12. The system of claim 7, wherein modifying the first configuration setting is based on the analyzed historical test run information.

13. A non-transitory machine-readable storage medium including instructions that, when accessed by a processing device, cause the processing device to:
provide, by the processing device, a test entity as an extension of a script execution environment, wherein the script execution environment is built on a software framework of a computer system of the processing device, and wherein the test entity comprising test entity invocation modules to implement configuration settings for a test managed by the test entity;

execute, by the test entity, a test execution script to perform the test on software in view of a first configuration setting defined in the test execution script via a setup parameter of the test entity, wherein the setup parameter comprises an execution parameter that represents different hardware profiles on which the test execution script is executed, and wherein the test execution script acts as a black-box to prevent script changes from influencing the test entity;

receive, by test entity invocation logic of the test entity, a second configuration setting for the test via the setup parameter of the test entity, wherein the setup parameter provides an abstraction layer for the test entity from the first and second configuration settings, and wherein the test entity invocation logic comprises a single configuration variant;

provide, by test entity invocation logic, the second configuration setting for the test to test execution logic of the test entity, wherein the second configuration setting is passed to the test execution logic from the test entity invocation logic via at least one of command-line arguments or configuration objects;

modify, by the test execution logic in runtime of the test execution script, the first configuration setting into the second configuration setting within the test execution script, wherein the abstraction layer enables the test execution logic to modify the test execution script without restarting the test execution script; and cause, by the processing device in the runtime of the test execution script without restarting the test execution script, the test execution script to perform the test on the software in view of the second configuration setting, wherein the test execution script utilizes multiple threads to perform the test concurrently with other tests, wherein the test is select by choosing a form of at least one of test identification or test name, and wherein the test comprises execution information in runtime.

14. The non-transitory machine-readable storage medium of claim 13, wherein the first and second configuration settings comprise at least one of hardware configuration settings or software configuration settings.

15. The non-transitory machine-readable storage medium of claim 13, wherein the test is performed to test one or more software components of a software program.

16. The non-transitory machine-readable storage medium of claim 13, wherein modifying the first configuration setting is based on predetermined criteria.

17. The non-transitory machine-readable storage medium of claim 13, further having instructions that, when executed, cause the machine to:
    query historical test run information relating to the test; and
    analyze the historical test run information.

18. The non-transitory machine-readable storage medium of claim 13, wherein modifying the first configuration setting is based on the analyzed historical test run information.

* * * * *